United States Patent Office 3,428,697
Patented Feb. 18, 1969

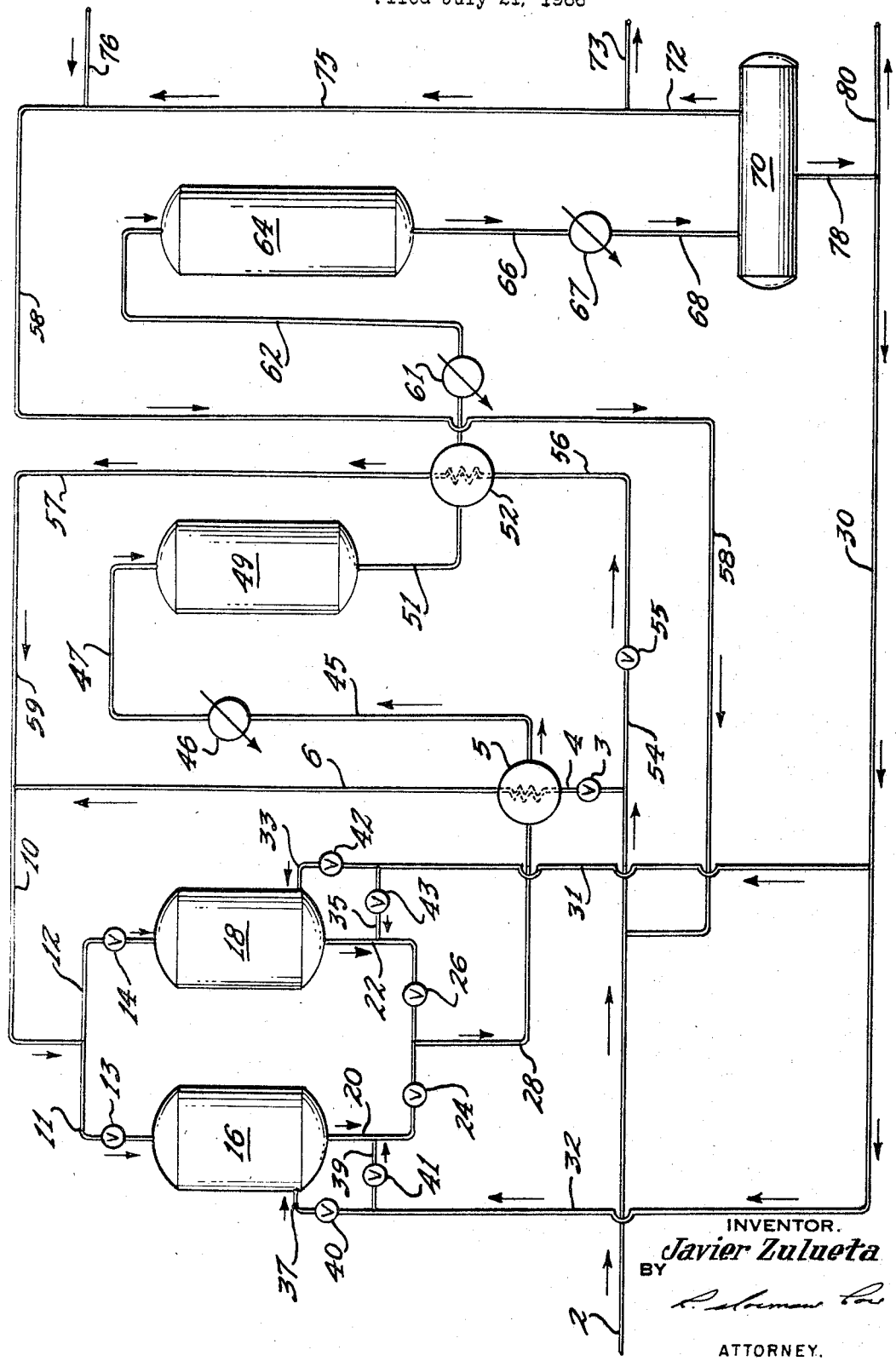

3,428,697
HYDROGENATION PROCESS
Javier Zulueta, Philadelphia, Pa., assignor to Air Products and Chemicals, Inc., Philadelphia, Pa., a corporation of Delaware
Filed July 21, 1966, Ser. No. 566,815
U.S. Cl. 260—667         8 Claims
Int. Cl. C07c 5/10

ABSTRACT OF THE DISCLOSURE

A process for hydrogenation of aromatic hydrocarbons to corresponding cycloaliphatic hydrocarbons in a series of three reaction zones is disclosed which is especially suitable for converting benzene to cyclohexane. All of the feed, as well as a hydrogen-containing gas stream passes through the reaction zones seriatim with space rates (i.e. # aromatic/hr./# catalyst) and degree of hydrogenation in each zone being predetermined within given limits. Reaction exotherms are controlled so that reaction temperatures in any zone do not exceed 500° F., by the admixture of a recycle stream of cycloaliphatic hydrocarbon with first zone effluent, by appropriate inter-zone cooling and by choice of parameters relative to space rate and degree of hydrogenation.

---

This invention relates to an improved process for the catalytic hydrogenation of aromatic hydrocarbons to their corresponding cycloaliphatic hydrocarbons. While the process of this invention is of interest in the conversion of benzene to cyclohexane, toluene to methylcyclohexane, xylenes to dimethylcyclohexane and naphthalene to tetra- or decahydronaphthalene the process is particularly applicable to the manufacture of high purity cyclohexane from benzene and for simplicity the invention will be described in terms of such conversion of benzene to cyclohexane.

Cyclohexane is employed for the extraction of essential oils, as a paint and varnish remover and as a solvent in the plastics industry, particularly for resins used in wire coating. However, the most important use for cyclohexane is as a chemical intermediate in the preparation of cyclohexanol, cyclohexanone and adipic acid. Most of the cyclohexane produced today goes into nylon-6 and nylon-6,6 manufacture in which high purity (99+%) cyclohexane is preferred.

Due to the similarity in boiling points of hydrocarbons found in petroleum fractions as well as the tendency of cyclic hydrocarbons to form azeotropes, most of the cyclohexane produced today is based on benzene hydrogenation rather than on recovery of natural cyclohexane from refinery streams. However, most of the known catalytic processes for the hydrogenation of benzene have the drawback of low conversion at high space rates (i.e. # aromatic hydrocarbon/hr./# catalyst) and difficult temperature control due to the exothermic nature of the hydrogenation reaction.

It has now been discovered that cycloaliphatic hydrocarbons, such as cyclohexane, may be obtained at a purity of approximately 99.9% at substantially 100% conversion of the feed material in operations conducted in three reaction zones.

In accordance with the present invention, benzene and hydrogen are contacted with hydrogenation catalyst in a first reaction zone at a weight space rate of 25 to 50 (weight of benzene/hour/weight of catalyst) to effect hydrogenation of about 30 to 45 percent of the benzene charged; the effluent from the first reaction zone is then cooled and contacted with hydrogenation catalyst in a second reaction zone at a weight space rate of 10 to 25 to effect hydrogenation of 35 to 50 percent of the benzene charged to the first reaction zone; effluent from the second reaction zone is cooled and then contacted with hydrogenation catalyst in a third reaction zone at a weight space rate of about 0.5 to 4 to effect substantially complete hydrogenation of the remaining benzene; and the effluent from the third reaction zone is then passed to a flash drum or other suitable means for the recovery of substantially pure cyclohexane.

This process for obtaining substantially pure cycloaliphatic hydrocarbons, such as cyclohexane, in a continuous process is well adapted to large scale commercial operations. The use of a very high space rate and controlled conversion, particularly in the first and second reactors, completely and effectively maintains a desired control of the exothermic hydrogenation reaction thereby avoiding local overheating of the catalyst which can lead to isomerization and product contamination.

The process of this invention is illustrated in the accompanying drawing which shows schematically a preferred embodiment. While four distinct reactors are shown in the drawing, it will be understood that a larger or smaller number could be employed and that the reactors can be incorporated in a common housing or that one vessel having separate zones could be employed. Certain valves, pumps, heaters, condensers, compressors, etc., have been omitted from the drawing for the sake of simplicity.

In the drawing, benzene in line 2 is combined with hydrogen-containing gas from line 58 in a ratio of 1 mol of benzene to 3 to 20 mols of hydrogen-containing gas and the mixture is passed through lines 4 and 6 regulated by valve 3 and lines 54, 56 and 57 regulated by valve 55. The mixture is then passed through lines 59 and 10 into the first reaction zone. At least two reactors 16 and 18, operated alternately, comprise the first reaction zone. While one of these reactors is on stream, catalyst in the other reactor or reactors of the first reaction zone can be regenerated or replaced with fresh catalyst. Thus, valves 13, 14, 24 and 26 are operated to permit sequential flow of the mixture in line 10 either through line 11, reactor 16 and line 20 into line 28 or through line 12, reactor 18 and line 22 into line 28.

In the first reaction zone, chargestock is contacted with a hydrogenation catalyst at hydrogenation conditions including a reaction temperature of about 250 to 500° F. and at a space rate of 25 to 50 (weight of benzene/hour/weight of catalyst) to effect hydrogenation of at least 30 and not more than 45 weight percent of the benzene charged.

The temperature of the effluent from the first reaction zone is adjusted, if desired, by direct contact, i.e., quench with one to three and preferably one to 2.5 mols of recycled cyclohexane per mol of benzene charge material either before or after the effluent leaves the reaction zone, or by indirect means, or both direct and indirect means. In particular, recycled cyclohexane in line 30 is passed through lines 31 and 32 for injection through one or more lines 33, 35, 37 and 39 for cooling the effluent from the first reaction zone. The flow of recycled cyclohexane in these lines is regulated by valves 40, 41, 42 and 43. The effluent from the first reaction zone in line 28 is then passed through heat exchanger 5 where the effluent may be employed to preheat the feed stream before being sent through lines 45 and 47 to the second reaction zone. Any further desired adjustment in temperature may be obtained in heat exchanger 46 so that the temperature in the second reaction zone is maintained within the prescribed limits.

In the second reaction zone temperature adjusted effluent from the first reaction zone (at a temperature of about 250 to 400° F.) is contacted with hydrogenation catalyst at hydrogenation conditions in reactor 49 including a reaction temperature in the range of 275 to 500° F. and a space rate of 10 to 25, thereby effecting about 35 to 50 percent hydrogenation of the benzene originally charged to the first reaction zone. This degree of conversion is obtained notwithstanding the use of recycled cyclohexane to absorb heat of hydrogenation from the first reaction zone effluent.

Effluent from the second reaction zone in line 51 may be adjusted in temperature in heat exchanger 52 with feed benzene in lines 54, 56 and 57 which are regulated by valve 55. The effluent from the second reaction zone may be further adjusted in temperature by such means as heat exchanger 61 before passing (at a temperature of about 250 to 375° F.) through line 62 into the third reaction zone.

In the third reaction zone temperature adjusted effluent from the second reaction zone is contacted with hydrogenation catalyst in reactor 64 at hydrogenation conditions including a reaction temperature in the range of 275 to 450° F. and a space rate of 0.5 to 4 to effect substantially complete hydrogenation of all benzene charged to the third reaction zone.

The temperature of the effluent from the third reaction zone in line 66 is adjusted by suitable means such as heat exchanger 67 to a temperature of about 70° F. to about 150° F. and passed through line 68 into a flash drum 70 where liquid and vapor phases are separated. The vapor phase in line 72 comprises a hydrogen-rich gas. A portion of this vapor phase is vented in line 73, while the remainder is recycled in line 75 and combined with sufficient makeup hydrogen-containing gas from line 76 to provide 3 to 20 mols of hydrogen-rich gas in line 58 per mol of benzene chargestock in line 2. Similarly, a portion of the liquid phase in line 78 is recycled through line 30 to lines 31 and 32 while the remainder of the liquid phase is recovered in line 80 as substantially pure (99+%) cyclohexane product.

The catalyst employed in the present system is conventional hydrogenation catalyst and may be the same or different in each reaction zone. Such catalysts include nickel, cobalt, platinum, palladium, rhodium, iron or ruthenium preferably supported on a material such as alumina, silica, pumice stone, asbestos, kieselguhr, diatomaceous earth, etc. These catalysts may be used in the form of a stationary, moving or fluid bed. However, the stationary or fixed bed is preferred.

Although hydrogen may be used in pure form, such purity is not required. Make-up hydrogen purity is likewise not critical and can range between 30 and 100 percent. However, for hydrogen-containing gas having hydrogen purities below 60 percent adjustment of operating conditions may be required which can affect investment and operating cost. Normally, hydrogen in admixture with diluent gases such as nitrogen or methane is employed as the hydrogen-containing gas. If desired, all or a portion of the recycled gas stream may be purified, for example by liquefaction, to separate one or more of the inert or diluent gases from the hydrogen stream.

Operating pressures of about 200 to about 550 p.s.i. may be employed. Increased pressure will cause destructive reactions to be initiated at a lower temperature. By reducing the operating pressure, the temperature at which destructive reactions begin would be increased but simultaneously a higher temperature would be necessary to initiate the hydrogenation reaction.

In a preferred embodiment, the reactors are loaded with conventional nickel-kieselguhr supported catalyst so that each of the reactors in the first reaction zone have about 800 lbs. of catalyst, the second reaction zone contains about 1400 lbs. of catalyst and about 9000 lbs. of catalyst is present in the third reaction zone. On an hourly basis, approximately 327 lb. mols of benzene, 1,237 mols of methane and 3,649 mols of hydrogen are charged to the first reaction zone which is maintained at a temperature between 275 to 500° F.

The effluent from the first reaction zone is quenched with 651 mols of recycled cyclohexane. The combined first reaction zone effluent and recycled cyclohexane stream, comprising 763 mols of cyclohexane and 215 mols of benzene, is then contacted with the hydrogenation catalyst in the second reaction zone which is maintained at a temperature between about 300 and about 480° F.

The composition of the effluent from the second reaction zone comprises 910 mols of cyclohexane and 68 mols of benzene. Said effluent is charged to the third reaction zone which is maintained at a temperature between about 300 to about 400° F. Substantially complete conversion is obtained in the third reaction zone and the resulting product cyclohexane has a purity of about 99.9%.

Operating conditions in the aforementioned preferred embodiment includes an operating pressure of about 450 p.s.i. in the reactors and space rates of about 31.9 in the first reaction zone, about 12 in the second reaction zone and about 0.58 in the third reaction zone.

The present invention not only effects temperature control without the necessity of having specially designed reactor cooling means but also has the advantage of using a relatively small amount of catalyst in the first reaction zone where catalyst deactivation is the greatest. Use of swing reactors in the first reaction zone permits catalyst regeneration or replacement without process down time.

Obviously, many modifications and variations of the invention as hereinbefore set forth may be made without departing from the spirit and scope thereof, and therefore only such limitations should be imposed as are indicated in the appended claims.

What is claimed is:

1. The process for the catalytic hydrogenation of benzene to cyclohexane in a series of three reaction zones which comprises: mixing feedstock consisting essentially of benzene with hydrogen-containing gas in a mol ratio of 3 to 20 mols of hydrogen-containing gas per mol of benzene; contacting the resulting admixture in vapor phase with hydrogenation catalyst in a first reaction zone at a space rate of between about 25 and 50 and a temperature below 500° F. to effect hydrogenation of only between about 30 and 45% of the benzene in said feedstock; cooling the first reaction zone effluent by admixture with one to three mols of recycled cyclohexane per mol of benzene feedstock; contacting the resulting cooled effluent admixture in vapor phase with hydrogenation catalyst in a second reaction zone at a space rate of between about 10 and 25 and a temperature below 500° F. to effect hydrogenation of between about 35 and 50% of the benzene contained in the feed to the first reaction zone; cooling the effluent from the second reaction zone; contacting the cooled effluent from the second reaction zone in a third reaction zone in vapor phase with hydrogenation catalyst at a space rate of between about 0.5 and 4 and a temperature below 500° F. to effect substantially complete hydrogenation of the remaining benzene; cooling the effluent from the third reaction zone and thereafter separating it into liquid and vapor phase materials; recycling at least a portion of the vapor phase material comprising hydrogen to the first reaction zone; recycling a portion of the liquid phase material comprising cyclohexane for admixture with the first reaction zone effluent; and recovering the remaining portion of the liquid material as cyclohexane product.

2. The method of claim 1 wherein the first reaction zone effluent is cooled to a temperature of between about 250 and 400° F. before passing to the second reaction zone and the second reaction zone effluent is cooled to a temperature of between about 250 and 375° F. before passing to the third reaction zone.

3. The method of claim 1 wherein the temperature in the first reaction zone is maintained between about 250 and 500° F., the temperature in the second reaction zone is maintained between about 275 and 500° F. and the temperature in the third reaction zone is maintained between about 275 and 450° F.

4. The method of claim 1 wherein the operating pressure in the reaction zones is maintained between about 200 and 550 p.s.i.

5. The method of claim 1 wherein the reactor effluent from the second reaction zone is employed to preheat the benzene feedstock to the first reaction zone.

6. The method of claim 1 wherein the reactor effluent from the first reaction zone is employed to preheat the benzene feedstock to the first reaction zone.

7. A process for the catalytic conversion of a feed consisting predominantly of an aromatic hydrocarbon to its corresponding cycloaliphatic hydrocarbon, said corresponding aromatic and cycloaliphatic hydrocarbons being selected from the groups consisting of: benzene and cyclohexane; toluene and methylcyclohexane; xylene and dimethylclohexane; naphthalene and tetrahydronaphthalene and naphthalene and decahydronaphthalene, comprising the steps of:

(a) establishing three catalytic reaction zones, each of which contains an amount of hydrogenation catalyst which is a function of the predetermined space rate for said zone;

(b) flowing a stream of hydrogen-containing gas through said zones in series;

(c) feeding 100% of the feed to the first reaction zone wherein it contacts catalyst and said gas stream at controlled vapor phase hydrogenation conditions, which conditions include reaction temperature below 500° F. and a space rate of from 25 to 50 pounds of aromatic hydrocarbon per hour per pound of catalyst, whereby only from 30 to 45% of the aromatic content of the feed is hydrogenated;

(d) admixing with the effluent from said first reactor, a recycle stream of cycloaliphatic hydrocarbon derived from step (j) below;

(e) feeding said admixture of feed and recycle to the second reaction zone wherein it contacts catalyst and said gas stream at controlled vapor phase hydrogenation conditions, which conditions include reaction temperature below 500° F. and a space rate of from 10 to 25 pounds of aromatic hydrocarbon per hour per pound of catalyst, whereby an additional 35 to 50% of the aromatic content of the original feed is hydrogenated;

(f) cooling the effluent from the second reaction zone to a temperature below 400° F.;

(g) feeding the cooled second reactor effluent to the third reaction zone wherein it contacts catalyst and said gas stream at controlled vapor phase hydrogenation conditions, which conditions include reaction temperature below 500° F. and a space rate of between 0.5 and 4 pounds of aromatic hydrocarbon per hour per pound of catalyst, whereby substantially complete hydrogenation of the remaining aromatic content of the feed is obtained;

(h) cooling and, thereafter, separating the effluent from the third reaction zone into a vapor phase comprising hydrogen and a liquid phase comprising cycloaliphatic hydrocarbon;

(i) recycling at least a portion of the vapor phase to serve as hydrogen-containing gas for step (b);

(j) recycling a portion of the liquid phase as the recycle material for step (d), and ((k) recovering the remaining portion of the liquid phase as high purity cycloaliphatic product.

8. The method of claim 7 wherein from 1 to 3 mols of cycloaliphatic hydrocarbon are recycled in step (d) for every mol of aromatic hydrocarbon fed to the first reaction zone.

References Cited

UNITED STATES PATENTS

| | | | |
|---|---|---|---|
| 2,303,075 | 11/1942 | Frey | 260—667 |
| 2,373,501 | 4/1945 | Peterson | 260—667 |
| 2,833,698 | 5/1958 | Patton et al. | 208—143 |
| 3,147,210 | 9/1964 | Hass et al. | 260—667 |
| 3,175,015 | 3/1965 | Johnson | 260—667 |
| 3,190,830 | 6/1965 | Rowland et al. | 208—143 |
| 3,254,134 | 5/1966 | Smith et al. | 260—667 |
| 3,258,431 | 6/1966 | Fisher | 260—667 |
| 3,318,965 | 5/1967 | Hutto et al. | 208—143 |
| 3,341,613 | 9/1967 | Hann | 260—667 |

DELBERT E. GANTZ, *Primary Examiner.*

V. O'KEEFE, *Assistant Examiner.*

U.S. Cl. X.R.

208—143